United States Patent
Ing et al.

(10) Patent No.: US 6,556,902 B2
(45) Date of Patent: Apr. 29, 2003

(54) METHOD OF MONITORING AND DISPLAYING HEALTH PERFORMANCE OF AN AIRCRAFT ENGINE

(75) Inventors: Ng Chun Ing, Singapore (SG); Christopher Neo Tong Teng, Singapore (SG)

(73) Assignee: Singapore Technologies Aerospace Ltd., Singapore (SG)

( * ) Notice: Subject to any disclaimer, the term of this patent is extended or adjusted under 35 U.S.C. 154(b) by 0 days.

(21) Appl. No.: 09/892,178

(22) Filed: Jun. 26, 2001

(65) Prior Publication Data

US 2002/0016654 A1 Feb. 7, 2002

(30) Foreign Application Priority Data

Jun. 29, 2000 (SG) .......................................... 200003458

(51) Int. Cl.[7] .......................... G11B 5/02; G01M 15/00; G06F 15/50
(52) U.S. Cl. .......................... 701/29; 701/31; 340/438; 73/117.2
(58) Field of Search ............................... 701/29, 31, 3, 701/35, 14, 110, 113, 99; 340/438, 441, 439, 971, 945, 973; 73/117.2, 178 R, 117.3, 117.4

(56) References Cited

U.S. PATENT DOCUMENTS

| | | | | |
|---|---|---|---|---|
| 4,398,258 A | * | 8/1983 | Naitoh et al. ................ 364/551 |
| 4,787,053 A | * | 11/1988 | Moore .................... 364/551.01 |
| 4,891,971 A | * | 1/1990 | Jones et al. ................. 73/117.3 |
| 5,050,081 A | * | 9/1991 | Abbott et al. ........... 364/424.06 |
| 5,668,542 A | * | 9/1997 | Wright ........................ 340/971 |
| 6,216,066 B1 | * | 4/2001 | Goebel et al. ................. 701/29 |
| 6,292,723 B1 | * | 9/2001 | Brogan et al. ................ 701/29 |
| 6,294,988 B1 | * | 9/2001 | Shomura ..................... 340/438 |

* cited by examiner

*Primary Examiner*—Tan Q. Nguyen
*Assistant Examiner*—Dalena Tran
(74) *Attorney, Agent, or Firm*—George O. Saile; Stephen B. Ackerman; Sevgin Oktay

(57) ABSTRACT

A method of monitoring and displaying health performance of an aircraft engine is disclosed. The method comprises the steps of: (a) sensing engine parameters at operable positions of the aircraft engine; (b) recording and generating continuous output signals reflective of the current behavior of the aircraft engine; (c) comparing said output signals with a set of predetermined reference signals to determine if each individual parameter is operating in the safe or danger region; (d) providing an indication of the engine parameter if it is in the danger region; and (e) simultaneously displaying all representative values of the health parameters in a digital and graphical form. The output signals are displayed on a multi-function display and are displayed in a qualitative form. Two different layouts are presented, that is, the bar format and the dial format. Visual effects to give an intuitive display are greatly enhanced through the use of colors and changes in the display format. The final result of the present invention is a display that greatly improves the situation awareness of the pilot in operation of the aircraft.

9 Claims, 2 Drawing Sheets

METHOD OF MONITORING AND DISPLAYING HEALTH PERFORMANCE OF AN AIRCRAFT ENGINE

BACKGROUND OF THE INVENTION (a) Field of the Invention

The present invention relates to the field of the health performance of an aircraft engine, and in particular, a method of determining and monitoring a set of output signals reflective of the engine health, for the creation of a new page on the multi-function display of the aircraft, and the representation of all engine health parameters in a qualitative form where visual effects are greatly enhanced.

(b) Brief Description of the Prior Art

Cockpit instrumentation display of an aircraft has always been one of the most important factors affecting pilot-machine interface. To minimize mental effort required by the pilot to interpret aircraft data, it is imperatively important for the pilot to pay attention to the contents and format of the data display.

The early conventional instruments of aircraft are generally analogue devices where engine performance of the aircraft cannot be presented visually to the pilot. The conventional instruments receive signals from the engine and display it on dial gauges. However, there is no analysis done on these signals. Even if there is a failure in any of the engine health parameters, no form of indication is provided to the pilot to warm him of danger. Therefore, there exists a need for a method to monitor the engine health parameters so as to provide the pilot a form of warning.

In modern aircraft, the concept of a "glass cockpit" has been widely adopted, where large areas of the cockpit of the aircraft are being taken up by large, multi function displays, and thus, very limited space is left. The conventional, round, dial gauges that show the engine health had to be redesigned to accommodate the new cockpit layout as the dial gauges take up too much space.

Another further drawback of the conventional analogue gauges of the aircraft is that the gauges are spread widely apart and require effort by the pilot in analyzing the data as the displays are not intuitive. This is detrimental in modern air combat scenarios where high "g" forces are experienced.

In analogue dial gauges, there is little colour representation on the display. Colour representation aids greatly in situation awareness and visual effects, especially when the engine parameters are operating in dangerous regions.

SUMMARY OF THE INVENTION

In order to overcome the disadvantages of conventional method of presenting engine health parameters, the present invention provides a method of monitoring the engine health parameters, leading to a creation of an enhanced engine performance indicator page on the multi function display. The enhanced engine performance indicator is represented in two different layouts, that is, the bar format (FIG. 1) and the dial format (FIG. 2).

It is an object of the present invention to provide a method of monitoring and displaying the actual health parameters of an aircraft engine, where all the engine health parameters will be displayed in a qualitative form (digital and graphical form) within a multi-function display on the aircraft.

A further object of the present invention is to provide a method of monitoring and displaying the actual health parameters of an aircraft engine, wherein the engine health parameters are sensed, recorded and output signals reflective of the current behavior of the engine are generated.

It is yet another object of the present invention to provide a method of monitoring and displaying the actual health parameters of an aircraft engine, wherein the engine health parameters consist of rotation per minute (RPM), oil pressure (OIL), fan turbine inlet temperature (FTIT), fuel flow indicator (F/F) and nozzle position indicator (NPI).

Yet another object of the present invention is to provide a method of monitoring and displaying the actual health parameters of an aircraft engine, wherein all of the parameters are arranged in a straight scale and the parameters are grouped together, in a bar format or dial format, facilitating the pilot to analyze the data.

Yet a further object of the present invention is to provide a method of monitoring and displaying the actual health parameters of an aircraft engine, wherein the parameters of rotation per minute and fan turbine inlet temperature are displayed in a bar format while oil pressure and fuel flow are represented as fine lines in FIG. 1 and arrows in FIG. 2.

A further object of the present invention is to provide a method of formation of an enhanced engine performance indicator, wherein the engine parameters, oil pressure and rotation per minute share the same scale, making efficient use of limited space of the multi-function display. Similarly, fuel flow and fan turbine inlet temperature are also measured using a single scale.

Yet another object of the present invention is to provide a method of formation of an enhanced engine performance indicator, where the nozzle position indicator is displayed in an intuitive way where one glance of the filled circle and the digital number displayed will allow the pilot to determine the present nozzle position, without much effort.

Another object of the present invention is to provide a method of formation of an enhanced engine performance indicator, wherein the normal healthy colour is blue for rotation per minute and fan turbine inlet temperature, yellow for oil pressure and if any of these indicators detect that the parameter is operating in the danger region, the respective bar display or the yellow line or arrow will turn red, and the digital number displayed for the parameter will turn red and blink, facilitating the pilot to tell immediately if any of the parameters are operating in the danger region, just by looking at the colors on the display.

Yet another object of the present invention is to provide a method of formation of an enhanced engine performance indicator, wherein the fine lines beside the bar displays represent the safe and danger regions for rotation per minute and fan turbine inlet temperature, facilitating the pilot to tell immediately which parameters are operating in the danger region.

Other objects as well as the numerous advantages of the method in accordance with the present invention will become apparent from the following detailed description and the accompanying drawings.

DESCRIPTION OF THE PREFERRED EMBODIMENTS

Figure 1:
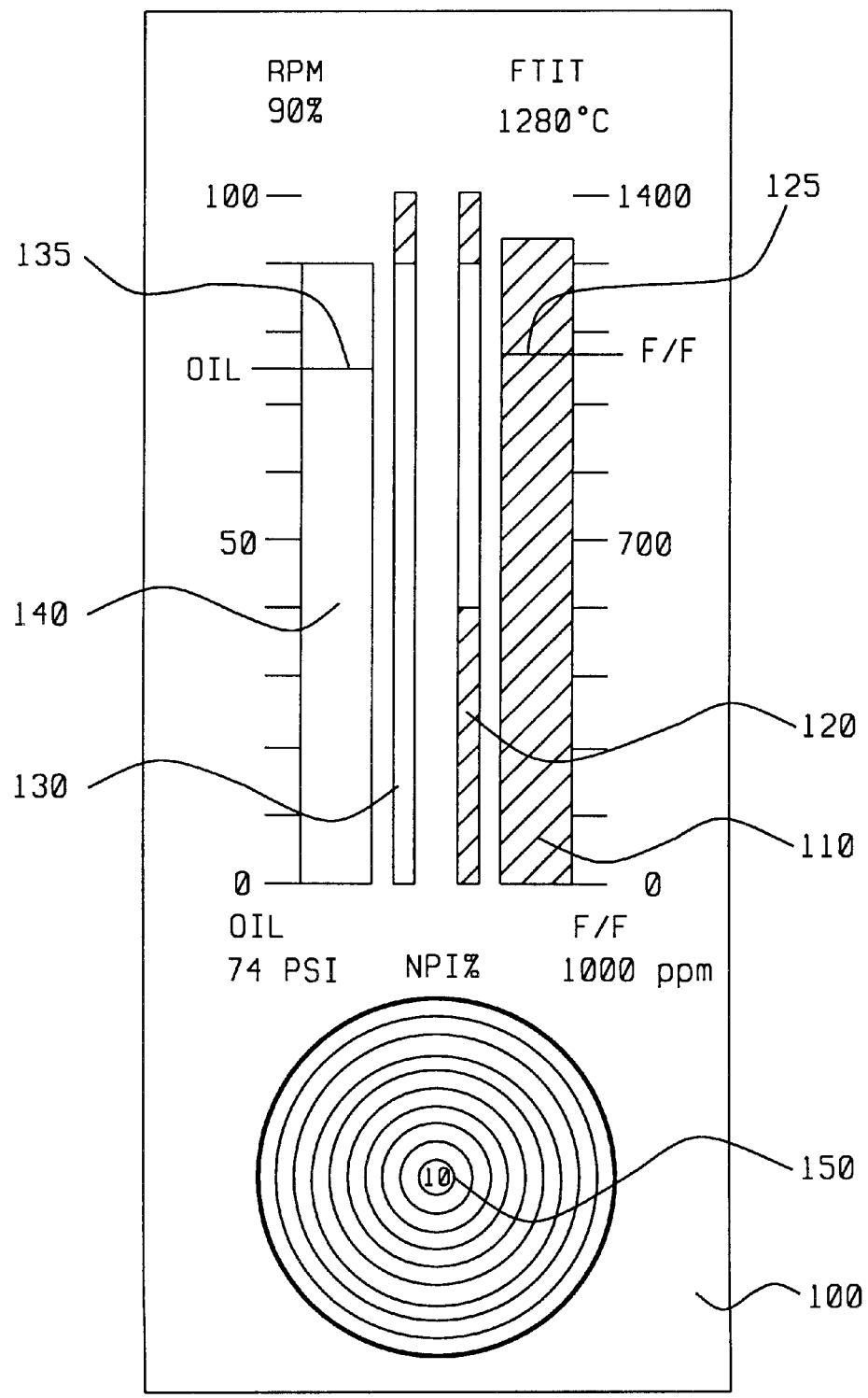
FIG. 1 is a schematic view showing an enhanced engine performance indicator of the present invention, displayed on a multi-function display in the bar format, showing the layout and contents of the engine performance indicators.
Figure 2:
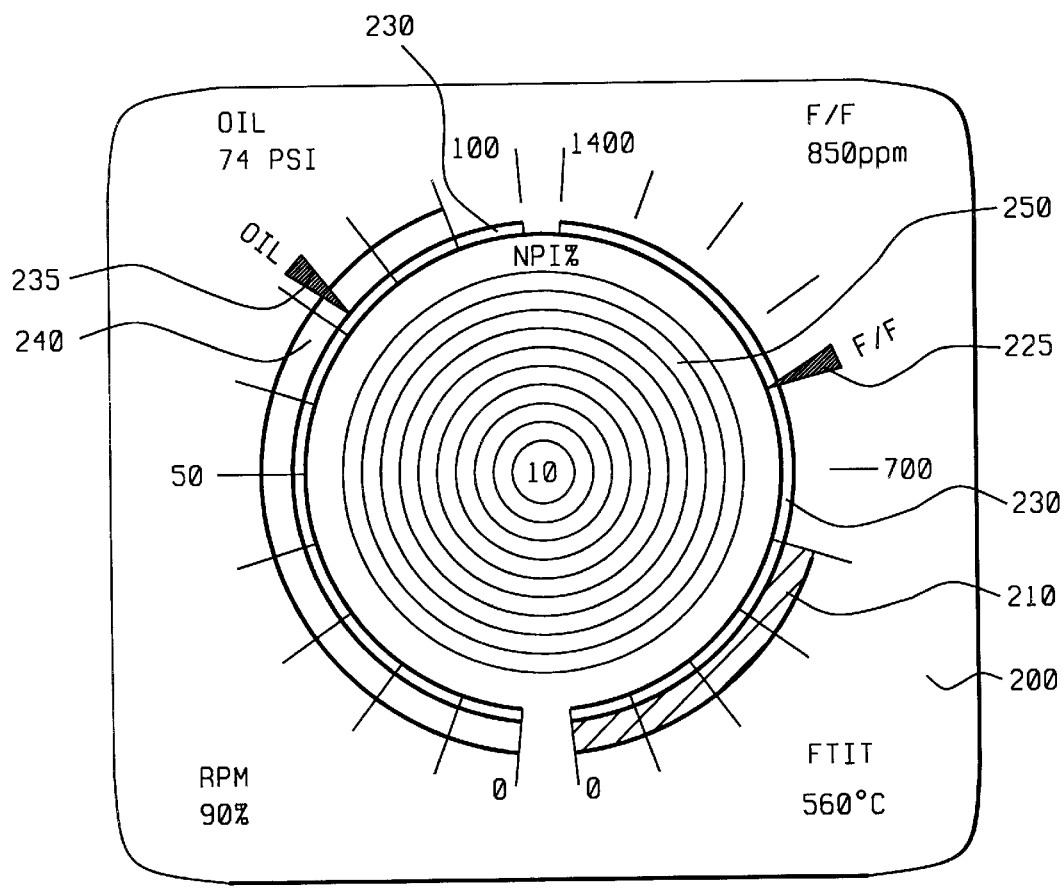
FIG. 2 is a schematic view showing an enhanced engine performance indicator of the present invention, displayed on a multi-function display in the dial format, showing the layout and contents of the engine performance indicators.

The schematic drawing of FIG. 1 and FIG. 2 provides an overview of the enhanced engine performance indicator page in accordance with the present invention.

The conventional analogue dial gauges that show the engine health are redesigned to be displayed in a qualitative way and displayed as a new page on the multi-function display. In accordance with the present invention, it is called the enhanced engine performance indicator page. There are two different formats, namely, the bar (FIG. 1) and the dial format (FIG. 2).

In accordance with the present, a method of monitoring and displaying the actual health parameters of an aircraft engine under normal operating conditions comprises the steps of:

(a) sensing the engine performance related parameters at operable positions of the aircraft engine;

(b) recording and generating continuous output signals reflective of the current behavior of the engine;

(c) comparing the output signals with a set of predetermined reference signals to determine if each individual parameter is operating in the safe or danger region;

(d) providing an indication of the engine parameter if it is operating in the danger region; and (e) simultaneously displaying all the representative values of the health parameters in a digital and graphical form.

In accordance with the present invention, the engine health parameters are determined using sensors placed at operable positions of the engine. The parameters are recorded and continuous output signals reflecting the current behavior of the engine are generated. These output signals are compared with predetermined reference signals in order to determine if each individual parameter is operating in the safe or danger region. If the parameter is operating in the danger region, an indication is provided to the pilot to warn him of danger. In accordance with the present invention, the signals are outputted to a multi-function display (MFD) on the aircraft where all the health parameters are displayed simultaneously in a digital and graphical form. Such form of display has greatly enhanced the situation awareness of the pilot.

The multi-function display (100) of FIG. 1 shows four bars referenced by numerals (110), (120), (130) and (140), which represent in bar format engine performance related to fan turbine inlet temperature (TFIT), fuel flow (F/F), oil pressure (PSI), and revolutions per minute (RPM), respectively. Nozzle position indicator (NPI) is referenced by numeral (150) in the same Figure.

In the MFD (200) of FIG. 2, the same four parameters, namely, (TFIT), (F/F), (PSI) and (RPM) are represented in dial format with reference numerals (210), (220), (230) and (240), respectively. Nozzle position indicator (NPI) is referenced by numeral (250) in FIG. 2.

In accordance with the present invention, the engine parameters, revolutions per minute (RPM) and oil pressure (PSI) share the same scale from 0 to 100 in increments of 10, while the fan turbine inlet temperature (FTIT) and fuel flow (F/F) share the same scale from 0 to 1400 in increments of 140. In addition, oil pressure is displayed as a fine line (135) in FIG. 1 and an arrow (235) in FIG. 2, but in yellow colors in a real cockpit multi-function display (MFD). Similarly, fuel flow (F/F) is displayed as a fine line (125) in FIG. 1 and an arrow (225) in FIG. 2, but also in green colors in a real MFD. The safe and danger regions for the engine parameters, revolutions per minute and fan turbine inlet temperature are displayed as fine lines in the respective bar and dial displays.

As is seen in FIGS. 1 and 2, in both the bar and dial formats, the absolute values of the parameters are displayed in digital form. In the real aircraft cockpit MFDs, the bar displays will be blue if the parameters are operating in the safe region. The bar displays will turn red, and the numbers displayed in the digital format will be red and start to blink when the individual indicator detects that the parameter is operating in the danger region. The safe (blue) and danger (red) regions for revolutions per minute and fan turbine inlet temperature are defined by the thin lines found in the respective bar displays. In the black and white drawings of FIGS. 1 and 2, the would be red (danger) portions of the bars and dials, respectively, are depicted with cross-hatchings, while the blue (safe) portions are not.

Revolutions per minute is expressed in percentage from zero to one hundred. It will indicate failure if the value is greater than ninety percent. Similarly, fan turbine inlet temperature is expressed in degrees Celsius, from two hundred to one thousand four hundred. It will indicate danger when the value drops below five hundred and sixty degrees or exceeds one thousand two hundred and sixty degrees.

Oil pressure is expressed in pounds per square inch (PSI), from zero to one hundred and shares the same scale as revolutions per minute. The absolute value is displayed in digital format and is also yellow in a real MFD to correspond to the oil pressure parameter. The yellow line or arrow will turn red if the indicator detects that the parameter is operating in the danger region.

The fuel flow indicator displays the total fuel flow to the engine in pounds per minute (ppm). The range is from zero to one thousand four hundred. The absolute value is displayed in digital format and in a real MFD is also green to correspond to the fuel flow parameter.

The nozzle position indicator (NPI) displays the position of the exhaust nozzle which is calibrated from zero to one hundred percent. The size of the filled circle (150) and the number displayed inside represents the present nozzle position. A fully filled circle with one hundred percent displayed shows that the nozzle is fully open while zero percent represents a fully closed nozzle. Thus, as an example, the nozzle position shown in FIGS. 1 and 2 is 10% open.

It will be appreciated that the foregoing is considered as illustrative only of the principles of the invention and numerous modification and changes will readily occur to those skilled in the art, it is not desired to limit the invention to the exact method described, and accordingly, all suitable modification and equivalents may be resorted to, falling within the scope of the invention. Also, it will be apparent to those skilled in the art that the multi-function display of the invention can be used to display the health of any engine in any ship, and that the displayed colors may be different and adjusted to suit the environment in which the MFD is utilized.

What is claimed is:

1. A method of monitoring and displaying the health parameters of an aircraft engine under normal operating conditions, comprising the steps of:

sensing engine parameters at operable positions of the aircraft engine;

recording and generating continuous output signals reflective of the current behavior of the aircraft engine;

comparing said output signals with a set of predetermined reference signals to determine if each individual parameter is operating in the safe or danger region;

providing an indication of the engine parameter if it is in the danger region; and simultaneously displaying all representative values of the health parameters in a digital and graphical form, wherein rotation per minute and oil pressure share the same scale, and the fan turbine inlet temperature and fuel flow share the same scale.

2. A method of monitoring and displaying the health parameters of an aircraft engine under normal operating conditions as set forth in claim 1, wherein the health parameters include rotation per minute, fan turbine inlet temperature, fuel flow, oil pressure and nozzle position indicator.

3. A method of monitoring and displaying the health parameter of an aircraft engine under normal operating conditions as set forth in claim 2, wherein the rotation per minute and fan turbine inlet temperature are shown as bar displays while oil pressure and fuel flow are represented by fine lines.

4. A method of monitoring and displaying the health parameters of an aircraft engine under normal operating conditions as set forth in claim 1 or 2, wherein said health parameters displayed in a qualitative form enhance situation awareness.

5. A method of monitoring and displaying the health parameter of an aircraft engine under normal operating conditions as set forth in claim 1 or 2, wherein the health parameters form an enhanced engine performance indicator page being bar format and dial format on a multi-function display of the aircraft.

6. A method of monitoring and displaying the health parameter of an aircraft engine under normal operating conditions as set forth in claim 1, wherein the respective bar display for the rotation per minute or fan turbine inlet temperature turns red, the yellow line or arrow turns red for oil pressure, and the digital number displayed for the individual parameter turns red and blink upon a detection of the parameter operating in the danger region.

7. A method of monitoring and displaying the health parameter of an aircraft engine under normal operating conditions as set forth in claim 1, wherein the safe and danger regions for the engine parameters, rotation per minute and fan turbine inlet temperature are displayed as fine lines beside the respective bar displays.

8. A method of monitoring and displaying the health parameter of an aircraft engine under normal operating conditions as set forth in claim 1, a nozzle position indicator is displayed as concentric circles.

9. A method of monitoring and displaying the health parameter of an aircraft engine under normal operating conditions as set forth in claim 8, wherein the size of the circle and the number displayed represent the present nozzle position.

* * * * *